United States Patent
Lübben et al.

(10) Patent No.: US 9,315,072 B2
(45) Date of Patent: Apr. 19, 2016

(54) BOGIE SHAFT FOR A RAILWAY VEHICLE HAVING A STONE GUARD AND METHOD FOR PRODUCING SAME

(75) Inventors: Edzard Lübben, Erlangen (DE); Oliver Stier, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 464 days.

(21) Appl. No.: 13/701,088

(22) PCT Filed: May 19, 2011

(86) PCT No.: PCT/EP2011/058185
§ 371 (c)(1),
(2), (4) Date: Dec. 17, 2012

(87) PCT Pub. No.: WO2011/151195
PCT Pub. Date: Dec. 8, 2011

(65) Prior Publication Data
US 2013/0207409 A1    Aug. 15, 2013

(30) Foreign Application Priority Data
May 31, 2010   (DE) .......................... 10 2010 022 594

(51) Int. Cl.
*B60B 35/00*   (2006.01)
*B61F 5/50*   (2006.01)
*C23C 24/04*   (2006.01)

(52) U.S. Cl.
CPC . *B60B 35/00* (2013.01); *B61F 5/50* (2013.01); *C23C 24/04* (2013.01)

(58) Field of Classification Search
CPC .............. B61F 5/50; B61F 5/52; B61F 5/523; B61F 5/526; B60B 17/0024; B60B 35/166; B60B 35/00

USPC ............................................... 295/36.1, 37, 7
See application file for complete search history.

(56) References Cited

U.S. PATENT DOCUMENTS 2,558,384 A    6/1951 Pritchard
2,747,918 A *  5/1956 Blackwood ................. 295/36.1
(Continued)

FOREIGN PATENT DOCUMENTS

CN        2930975 Y    8/2007
DE   102005007588 A1   8/2006
(Continued)

OTHER PUBLICATIONS

D.Y.Li A new type of wear-resistant material: pseudo-elastic TiNi alloy Elsevier Wear 221 1998 pp. 116-123; Others.
(Continued)

*Primary Examiner* — Kip T Kotter
(74) *Attorney, Agent, or Firm* — Laurence Greenberg; Werner Stemer; Ralph Locher

(57) ABSTRACT

A bogie shaft for railway vehicles has a cladding which contains a metal component. The metal component is preferably electrochemically less refined, but no greater than exactly as refined, as a material of the bogie shaft. Corrosion on the bogie shaft can thereby be advantageously prevented. The metal material of the cladding is also able to effectively protect the bogie shaft against stone impact. The cladding can be advantageously applied by cold gas spraying, or a sleeve can be bent around the bogie shaft for forming the cladding. The cladding can advantageously contain particles that can make it more resistant to stone impact. The particles can be made, for example, of hard materials, of particularly ductile particles, or of particles made of a memory shape alloy.

10 Claims, 3 Drawing Sheets

(56) References Cited

U.S. PATENT DOCUMENTS

| | | | | |
|---|---|---|---|---|
| 4,158,407 | A | * | 6/1979 | Rest ............................... 206/318 |
| 4,200,326 | A | * | 4/1980 | Wilcox ............................ 295/23 |
| 5,531,369 | A | | 7/1996 | Richman et al. |
| 6,568,333 | B1 | * | 5/2003 | Kontio et al. ............... 105/218.1 |
| 8,343,573 | B2 | * | 1/2013 | Jensen et al. .................. 427/142 |
| 2010/0297345 | A1 | | 11/2010 | Jensen et al. |

FOREIGN PATENT DOCUMENTS

| | | | |
|---|---|---|---|
| DE | 102006029818 B3 | * | 12/2007 |
| DE | 102007046386 B3 | | 10/2008 |
| EP | 1690701 A1 | * | 8/2006 |
| EP | 1942040 A1 | | 7/2008 |
| EP | 2009132 A1 | * | 12/2008 |
| FR | 2881990 A1 | | 8/2006 |
| FR | 2911102 A1 | * | 7/2008 |
| WO | 0059764 A1 | | 10/2000 |
| WO | 02086182 A1 | | 10/2002 |

OTHER PUBLICATIONS

Bochumer Verein Verkehrstechnik GmbH Radsatzsysteme (Wheelset Systems) http://www.bochumer-verein.de/542.html;Apr. 28, 2010; Others.

Inovati Shape Memory Allow www.inovati.com/coating/shapememoryalloy.html; Others.

* cited by examiner

BOGIE SHAFT FOR A RAILWAY VEHICLE HAVING A STONE GUARD AND METHOD FOR PRODUCING SAME

BACKGROUND OF THE INVENTION

Field of the Invention

The invention relates to a bogie shaft for a railway vehicle, said bogie shaft having a cladding as a stone guard. The invention further relates to different methods for producing a cladding as a stone guard on such a bogie shaft for railway vehicles.

Bogie shafts that are provided with a stone guard are known and are offered for example by Bochumer Verein Verkehrstechnik GmbH. Coating methods can generally be used for the application of such a stone guard. Bogie shafts of railway vehicles are thus prevented from being damaged as a result of the impact of stones from the track ballast and/or the effects of damage can thus be limited. The disturbed ballast stones are specifically driven at relative speeds of up to 100 m/s into the rotating lateral surface of the shaft and, in so doing, produce impaction craters in the steel having a depth measuring in the (single-digit) millimeter range. It is thus desirable to protect the exposed parts of the lateral surface of the shaft against stone impact by means of a shielding.

However, other arguments dissuade from such a shielding. For example, this shielding impairs the visual checking of the shafts for inspection purposes. In addition, said shielding leads to an increased weight of the bogie. Lastly, corrosion may be promoted in the interface between the shielding and the shaft. A shielding of the bogie shaft is therefore omitted in many cases for reasons of operational safety, and it is instead accepted that the bogie shafts have to be replaced more frequently due to damage caused by stone impact. Thick paint coatings have become established as a stone guard, although the protective effect thereof against stone impact is quite limited, since the paint coatings do not demonstrate sufficient mechanical resistance to the forces effective during stone impact.

BRIEF SUMMARY OF THE INVENTION

The object of the invention is to improve a stone guard in the form of a cladding of a bogie shaft to the extent that effective protection against stone impact is achieved and, at the same time, corrosion of the bogie shaft can be prevented. A further object of the invention is to disclose a method for producing a cladding as a stone guard on the bogie shaft disclosed in the introduction, it being possible by means of said method to produce a cladding having the aforementioned property profile of a satisfactory stone impact protection and effective corrosion protection.

In accordance with the invention, the first object is achieved with the bogie shaft disclosed in the introduction in that the cladding has a metal component, which is at most as refined as the metal material forming the interface of the bogie shaft. Within the meaning of this invention, metal materials and metal components are to be understood to be metals or metal alloys. The fact that the metal component is at most as refined as the metal material of the bogie shaft or is less refined than said metal material means that, in other words, the metal component is to have a lower standard hydrogen electrode potential than the metal material of the bogie shaft. The cladding may be made 100% from this metal component. However, it is also possible for the metal component to form only part of the cladding, therefore for example only the region of the cladding that adjoins the interface of the bogie shaft. It is also conceivable, however, for the metal component to form a metal matrix, in which a further structural phase is distributed. In the broadest sense, any assembly covering the surface of the bogie shaft is to be understood as a cladding. In particular, this may be a coating located on the bogie shaft. It may also be an independently self-supporting casing, however.

Since the cladding consists of a metal component, a greater mechanical stability can be achieved compared, for example, to a protective paint coating. The cladding may therefore ensure effective protection against stone impact. In this case, the ductile behavior of the metal component also ensures that the cladding does not fail in the event of stone impact as a result of a brittle fracture. The stone impact may merely lead to a local plastic deformation of the cladding, wherein the protection of the cladding is maintained until the plastic deformation leads to a breakdown of said cladding as far as the surface of the bogie shaft.

Due to the fact that the cladding, at least at the interface of the bogie shaft, is at most as refined as the metal material of the bogie shaft, it is also ensured that no electrochemical local elements form at the interface between the cladding and the bogie shaft, said elements possibly leading to decay and therefore corrosion of the bogie shaft. With a standard hydrogen electrode potential of the metal component, which corresponds approximately to that of the metal material of the bogie shaft, no effective local elements will form. If the cladding with its metal component is considerably less refined than the metal material of the bogie shaft, the cladding thus acts as a galvanic anode, and is accordingly decayed with the occurrence of corrosion, whereas the bogie shaft remains protected against corrosive attack. This is also true if the cladding is broken down due to a stone impact, such that the underlying bogie shaft is exposed in an unprotected manner to the surrounding environment. This leads to a dual protective effect of the cladding against stone impact and also against corrosive attack at the bogie shaft.

According to an embodiment of the invention, the bogie shaft assembly further has a partition coating formed from an electrochemically less refined material than the metal material forming the interface of the bogie shaft or from an electrochemically inert material disposed between the interface of the bogie shaft and the cladding.

According to a further embodiment of the invention, the metal component of the cladding is electrochemically less refined than the metal material forming the interface of the bogie shaft and is in electrochemical contact with the interface of the bogie shaft.

The above object stated as the second object is also achieved by a method for producing a cladding on the bogie shaft, in which the cladding is produced by cold gas spraying by applying to the bogie shaft particles of a first type comprising a metal component, which is at most as refined as the metal material forming the interface of the bogie shaft. Alternatively, the object can also be achieved by a method in which the cladding is produced as a covering, which is wound around the bogie shaft. In the former case, a coating method according to the invention is provided, that is to say the cladding forms a layer on the bogie shaft. In the other case, the cladding is a self-supporting component, which is formed as a covering. This is then bent around the bogie shaft, wherein an abutting edge is produced between the two ends of the covering, which has to be sealed so that no moisture can penetrate inside the covering. This sealing process may preferably also be carried out by cold gas spraying.

Cold gas spraying is a method known per se, in which particles provided for the coating are accelerated by means of a convergent-divergent nozzle, so that they remain adhered to the surface to be coated due to their impressed kinetic energy. In this case, the kinetic energy of the particles is used, which leads to a plastic deformation thereof, wherein the coating particles are melted on merely at their surface upon contact. This method is therefore referred to as cold gas spraying compared to other thermal spraying methods because it is carried out at relatively low temperatures, at which the coating particles are substantially fixed. For cold gas spraying, which is also referred to as kinetic spraying, a cold gas spraying system is preferably used, which has a gas heating device for heating a gas. A stagnation chamber is connected to the gas heating device and is connected on the output side to the convergent-divergent nozzle, preferably a de Laval nozzle. Convergent-divergent nozzles have a converging portion and a diverging portion, which are connected by a nozzle neck. The convergent-divergent nozzle generates a powder jet on the output side in the form of a gas stream with particles of high speed located therein.

Cold gas spraying is known for example from DE 10 2005 007 588 A1. In accordance with this method it is possible to deposit what are known as "shape memory alloys", such as NiTi, on a surface.

As can be inferred for example from D. Y. Li, "A new type of wear-resistant material: pseudo-elastic TiNi alloy", WEAR 221 (1998), pages 116-123, shape memory alloys such as TiNi are also suitable in particular as wear-resistant coatings, since they are subject to low abrasion due to their pseudo-elastic behavior. This is also true in the case of the use according to the invention as a stone guard, since pseudo-elastic TiNi, upon impact of a stone from the gravel bed of the track, yields with an elasticity approximately 10 times that of metals, and the deformation of the cladding is reversible (discussed in greater detail hereinafter).

As already mentioned, an alternative to the cold gas spraying of the cladding is the production of a cladding as a covering. According to U.S. Pat. No. 5,531,369, a method is known that is suitable for reliably connecting such a covering to the bogie shaft. This is achieved by explosion cladding, wherein a fixed adhesion of the covering on the bogie shaft has the advantage that a corrosive attack in the gap can be reduced. Continuing within the context of the invention, it should also be noted at this juncture that, to reliably prevent corrosion in this gap, it is necessary to provide a metal between the cladding and the bogie shaft, said cladding being less refined than the material of the bogie shaft, wherein, in the context of the invention, this less refined material is considered to be part of the cladding according to the invention and forms the metal component, which at most is as refined as the metal material forming the interface of the bogie shaft.

Of course, other materials can also be deposited as shape memory alloys on the bogie shafts, or can encase said bogie shafts, by means of the method according to the invention. In this case, in addition for example to the particles of the first type, which form the component that is at most as refined as the metal material forming the interface of the bogie shaft, particles of a second type, which form a distributed structural phase in a structural matrix (formed from the particles of the first type), can also advantageously be deposited by means of the method for cold gas spraying according to the invention. A cladding can thus advantageously be produced on the bogie shaft, said cladding consisting of a composite material. For example, a bogie shaft can be produced with which the metal component in the cladding consists for example of the same metal material, therefore in particular steel, as the bogie shaft itself. It is thus possible that the metal component of the cladding is exactly as refined as the metal material forming the interface of the bogie shaft. A structural phase that increases the resistance of the cladding to stone impact and that advantageously can be produced by cold gas spraying of the particles of a second type together with the particles of the first type may advantageously be contained in this metal component.

A structural phase that increases the resistance of the cladding to stone impact may be formed for example by hard particles, wherein the particles are embedded in the metal component of the cladding. These hard particles have brittle behavior, which, with the occurrence of a stone impact, results in the fact that a force of impact of the stone introduced into this particle is transferred over the interface of this particle over a relatively large area to the matrix of the metal component. Peak loads in the metal matrix are therefore kept small, so that there is no plastic deformation, or at least less plastic deformation, of the metal matrix. This has the advantage that the metal matrix, and therefore the entire cladding, can withstand stone impacts over a relatively longer period of time.

With a greater kinetic energy of the stones from the track ballast, another protection mechanism of the solid particles can also be activated. In this case, these particles are destroyed, wherein the energy applied for the destruction process is lost, whereby the metal matrix is relieved of load. The solid particle fails in this case, but the metal matrix is maintained and can continue to exert its protective function. At the least, the plastic deformation of the metal component of the cladding, which forms the metal matrix, is reduced by the destruction of the solid particle or else a number of solid particles.

Another possibility lies in the fact that the structural phase is advantageously formed by pseudo-plastic or pseudo-elastic metal particles or particles of a material of which the modulus of elasticity is at most one tenth of that of the metal component of the cladding. In this case, these particles are embedded in the manner already disclosed in the metal component, which forms the metal matrix. In addition to pseudo-elastic metal particles, which are preferably formed from shape memory alloys, such as TiNi, plastics are also a possible material of low modulus of elasticity. The greater elasticity of these particles results in the fact that stone impacts can be intercepted elastically, and the stones rebound from the cladding according to the invention, wherein a comparatively lower level of lasting damage is produced on the cladding in this case. This means that plastic deformation of the metal matrix of the cladding occurs less frequently, or can even be avoided completely.

With use of pseudo-plastic metal particles, these particles behave similarly to the metal component in which they are embedded. Both structural portions have a similar modulus of elasticity. However, it is possible as a result of the pseudo-plastic behavior of the metal particles that said particles re-adopt their original shape before the deformation by the stone impact (shape memory effect) as a result of a thermal treatment following deformation caused by a stone impact with use of what is known as the "one-way effect" of shape memory alloys, whereby damage to the cladding can advantageously be remedied by means of a thermal treatment. In this case, the forces that are produced during the re-forming of the pseudo-plastic particles also act positively on the thermal matrix of the metal component, which is thus also re-formed again in part. In this case, it is important that the pseudo-plastic or pseudo-elastic behavior of the metal particles, which has to be set in a temperature-dependent manner according to the alloy composition of the shape memory alloy in question, is present at the operating temperature of the bogie shafts. In this case, it must be considered that bogie shafts are operated in a large temperature range due to the atmospheric weather conditions. For example, it is thus expedient for the pseudo-plastic and/or pseudo-elastic behavior to be ensured in a temperature range of the bogie shafts from −20 to +40° C. (Central European climatic conditions). In this case, it is possible for the phase conversion of the shape memory alloy to lie within this temperature range, wherein a pseudo-plastic behavior is present below the conversion temperature and a pseudo-elastic behavior is present above this temperature.

Alternatively, it is advantageously also possible for the metal component of the cladding to be coated with a pseudo-elastic or pseudo-plastic alloy. It is thus ensured, on the one hand, that the metal component forms the interface to the bogie shaft and is at most as refined as the metal material of the bogie shaft, as required in accordance with the invention, and on the other hand that a shape memory alloy can be used, which is arranged above this metal component and therefore does not come into direct contact with the material of the bogie shaft. This is therefore important because shape memory alloys such as NiTi are generally more refined than the material of the bogie shaft, and the risk posed to the bogie shaft by corrosion can only be eliminated in this way. The pseudo-elastic or pseudo-plastic alloy, which therefore forms the surface of the cladding with respect to the surrounding environment, may have a positive effect by way of the mechanisms already described on the resistance to stone impact of the cladding and advantageously leads to a longer service life thereof.

In addition, a partition coating formed from a material that is less refined than the metal material forming the interface of the bogie shaft or from an electrochemically inert material may also advantageously be provided between the interface of the bogie shaft and the cladding. The partition coating may be applied in this case to the shaft or inside the cladding, or the partition coating and cladding are applied as a multi-layered coating to the bogie shaft. In any case, the partition layer is to be understood, however, as part of the cladding. The partition layer improves the corrosion behavior between the cladding and the bogie shaft, wherein different mechanisms can be used here. If the partition layer consists of a metal that is less refined compared to the rest of the cladding and the bogie shaft, this is thus to be understood as a galvanic anode so to speak. Should corrosion occur, a gap indeed thus forms in the region of the partition layer between the bogie shaft and the cladding, but the bogie shaft and the cladding are not attacked by the corrosion, at least not initially. This has the advantage that the function both of the bogie shaft and of the cladding is fully retained. Only in the event of progressive corrosion may a corrosive attack of the cladding also occur, wherein said cladding still constitutes corrosion protection for the bogie shaft if it is less refined than the material of the bogie shaft.

If the interface is provided as an electrochemically inert material, an insulation is thus simultaneously produced between the bogie shaft and the cladding. Corrosion can thus be prevented if the partition layer is electrochemically dense. Only damage to the partition layer causes the rest of the cladding, specifically the unrefined metal material of the cladding, to act as corrosion protection for the bogie shaft due to its property of being less refined than the material of the bogie shaft. The material of the cladding, and not the material of the bogie shaft, is then corrosively decayed. An electrochemically inert material is plastic for example, or an electrically non-conductive ceramic.

It is also advantageous if an indicator coating that is formed from colored material and is permeable to moisture is provided between the interface of the bogie shaft and the cladding. Due to the permeability to moisture, the indicator coating does not cause any galvanic separation of the bogie shaft from the rest of the cladding, which is formed by the less refined material. The less refined material may thus act as a galvanic material in the manner already described in the event of a corrosive attack in the gap, provided the indicator coating itself is not less refined than the unrefined material of the metal component. Rather, the indicator coating has a different function, namely to make it possible, as a result of a simple visual inspection of the cladding, to indicate a breakdown of the cladding as a result of stone impact, since the color of the indicator layer is externally visible. The indicator layer should therefore not be involved in any corrosion processes in the gap between the cladding and bogie shaft, so that it is still retained after consumption of the cladding and can indicate the color change. Of course, it is also conceivable however to use the partition coating already mentioned for the purposes of an indication of a breakdown of the cladding, if said partition coating has a characteristic color (advantage of functional integration).

Partition coatings and/or indicator coatings on the bogie shaft can be produced in accordance with the invention by the cold gas spraying method already mentioned by applying to the bogie shaft, before application of the particles of the first type, which form the metal component of the cladding, particles of a further type. Further particles may, of course, also be applied after application of the particles of the first type, that is to say once the metal component of the cladding has been produced. For example, a sealing of the cladding can be applied in this manner and protects the cladding externally against corrosion for example, at least until the first stone impact occurs.

In addition, the method of cold gas spraying may advantageously also be used to refill damage in the cladding, caused by stone impact, with the material of the cladding. To this end, cold gas spraying is particularly suitable, since it can also be carried out using portable apparatuses, which are equipped with what are known as "cold gas spraying guns". These can be operated by hand, that is to say the cold gas spraying gun is directed to the craters present in the cladding so as to refill them. In particular, the cladding can thus be repaired at points where the indicator coating already mentioned can be seen, so as to reinstate the protective function of the cladding at these points.

In terms of the material selection for the metal component, the different configurations for the cladding have to be considered. If, for example in accordance with an advantageous embodiment of the invention, the metal component of the cladding is less refined than the metal material forming the interface of the bogie shaft and is in direct electrochemical contact with the interface of the bogie shaft, metals such as Al, Mg, Ti, Zn, Mn, V, Nb and alloys thereof, provided these are likewise less refined than the material of the bogie shaft, are thus suitable as a metal component for example.

It is advantageous if the metal component of the cladding contains a light metal. In this case, this may be the main alloy component of an alloy and/or this material may be used purely as a metal component. The use of a light metal has the advantage that the overall weight of the bogie shaft is increased to a relatively lesser extent by the cladding. In particular, Al, Ti and alloys thereof are possible light metals.

It is also advantageous if the metal component of the cladding spontaneously forms a passivation coating under atmospheric influence. The corrosive attack on the interface of the cladding exposed to the atmosphere can thus advantageously be kept low. If the cladding is damaged by stone impact, the damaged location is thus immediately re-passivated spontaneously, such that a corrosive attack of the cladding already damaged can thus still be prevented. Possible weather-proof light metals so to speak include Al, Ti and Zn and alloys thereof.

Further details of the invention will be described hereinafter on the basis of the drawing. Like or corresponding elements in the drawing are provided with like reference signs in each case and will only be explained more than once in terms of the differences between the individual figures, in which:

DESCRIPTION OF THE INVENTION

Figure 1:
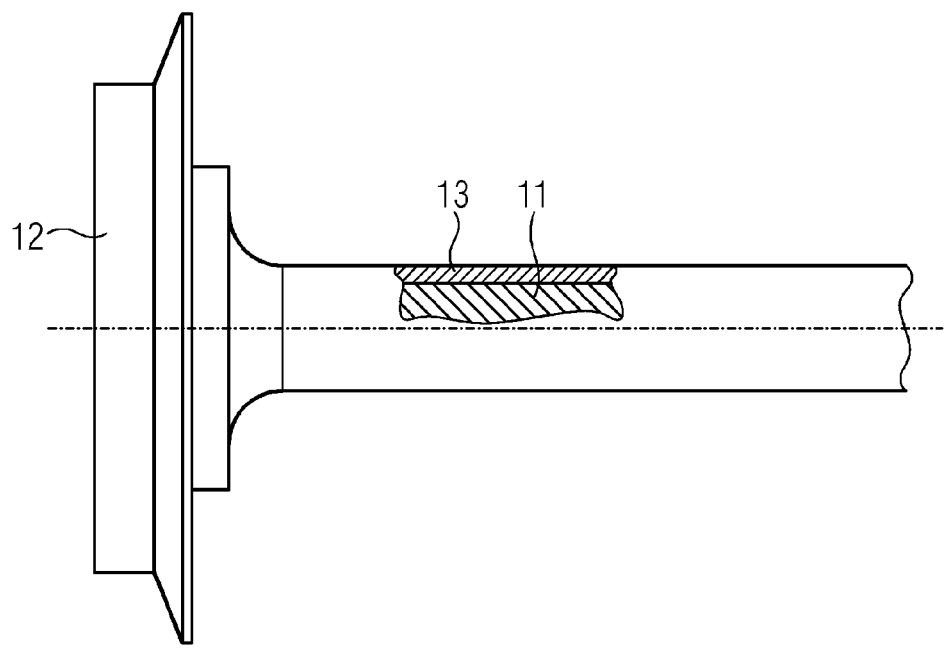
FIG. 1 shows an exemplary embodiment of the bogie shaft according to the invention with an individual detail.

A bogie shaft 11, which is connected to a wheel 12, is illustrated in FIG. 1. To protect the bogie shaft 11 against stone impact, it is provided with a cladding 13, as illustrated in a detail, which can be structured differently, as will be described in the following figures.

Figure 2:
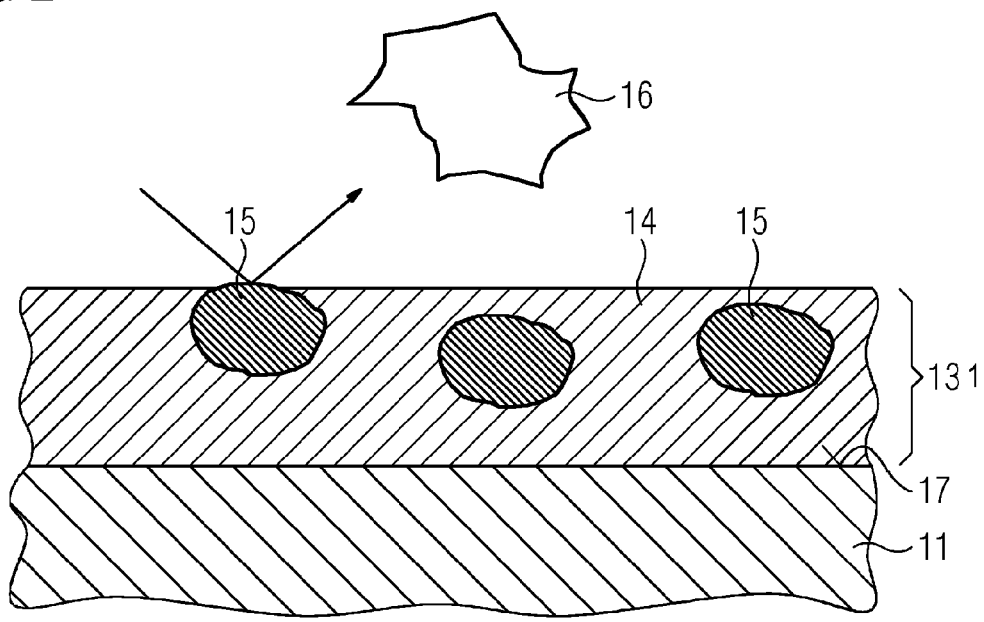
FIGS. 2 to 4 show exemplary embodiments for the cladding according to the invention as individual details.

According to FIG. 2, the cladding 131 is formed from a metal component 14, in which pseudo-elastic particles 15 formed from NiTi are distributed. If a stone 16 contacts a region of the cladding 131, which is protected by such a superelastic particle 15, said stone thus rebounds from the cladding 131 in the manner indicated by an arrow, without causing any lasting damage.

The metal component 14 of the cladding 131 is formed from the same steel as the bogie shaft 11. Direct contact is therefore possible between the bogie shaft 11 and the cladding 131, since corrosion, at least due to the formation of electrochemical local elements, at the interface 17 to the cladding defined by the bogie shaft can be excluded.

Figure 3:
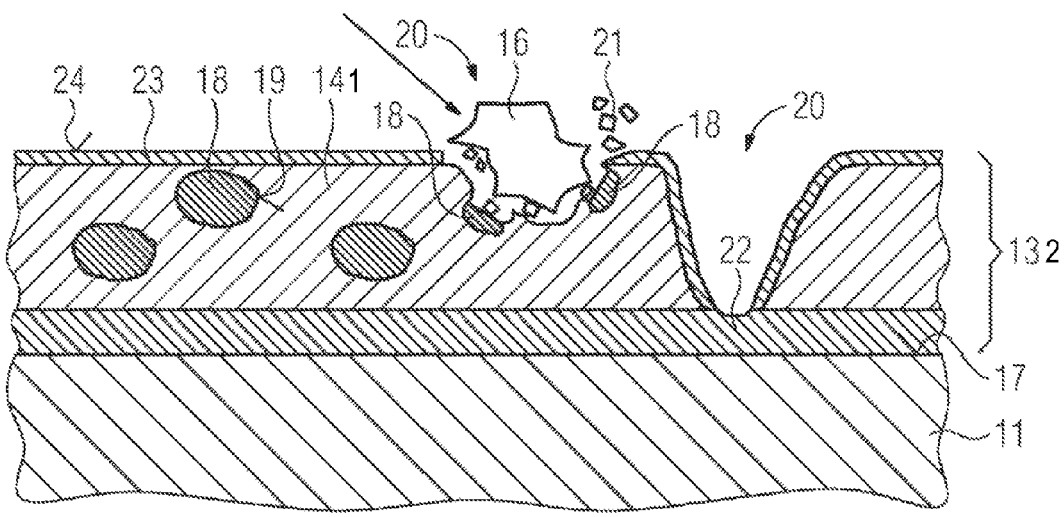

According to FIG. 3, the cladding 132 consists of the metal component 141, in which the hard particles 18 are incorporated. These hard particles are able to trigger two protection mechanisms in the event of impact of a stone 16. One protection mechanism (not illustrated) lies in the fact that the solid particles, which are hardly elastic, do not deform as a result of the stone impact and therefore the load impressed by the stone is distributed over a phase interface 19 between the hard particles 18 and the metal component 141, which forms a metal matrix around the hard particles 18. The second mechanism is also illustrated in FIG. 3. If the stone 16 has sufficient kinetic energy, the distribution of the impact over the hard particles 18 is insufficient. The metal component 141 is attacked, wherein hard particles 18 are destroyed in the resultant crater 20. The destruction of the hard particles into smaller splinters 21, which are produced by the particles breaking, absorbs energy however, such that the load of the metal component 141 is reduced as a result of the destruction of the hard particles 18.

With progressive destruction of the metal component 141, this is gradually depleted completely. As soon as the depth of a crater 20 penetrates the entire thickness of the metal component 141, the indicator coating 22 arranged beneath the metal component 141 is exposed and is of such a color that it is immediately noticeable during a visual inspection of the cladding 132. The cladding 132 can then be repaired so as to completely reinstate the function thereof.

The metal component 141 is formed from an aluminum alloy. This has the advantage that it is relatively lightweight. In addition, aluminum forms a passivation coating 23, which protects the surface 24 of the cladding 132 against weather-induced corrosive attack. Since aluminum passivates spontaneously, the formation of the passivation coating 23 after stone impact is also ensured, such that a corrosive attack in the formed crater can also be avoided. This is particularly important since the metal component is in any case already weakened in the region of the crater.

Figure 4:
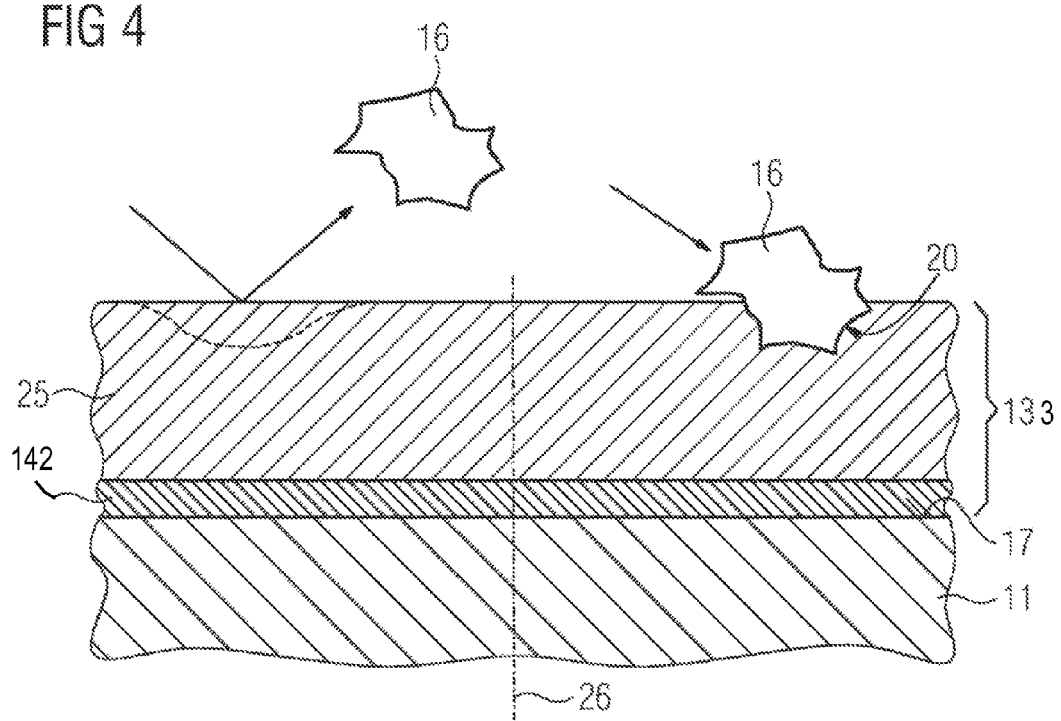

According to FIG. 4, the metal component 142 which at most is as refined as the material of the bogie shaft 11, is formed as a relatively thin partition layer, which carries a further layer 25 formed from NiTi. The cladding 133 is therefore formed as a multi-layer coating. The layer 25, as illustrated to the left of a broken line 26, may be pseudo-elastic. In the event of stone impact, this leads to a rebound of the stone 16 in accordance with the indicated arrow. If the layer 25 is pseudo-plastic, the stone 16 thus forms a crater 20. However, this damage to the layer 25 can be remedied by a subsequent thermal treatment, since the shape memory alloy "remembers" the original shape of the layer, and the old structure is thus reproduced on the basis of a phase conversion process.

Figure 5:
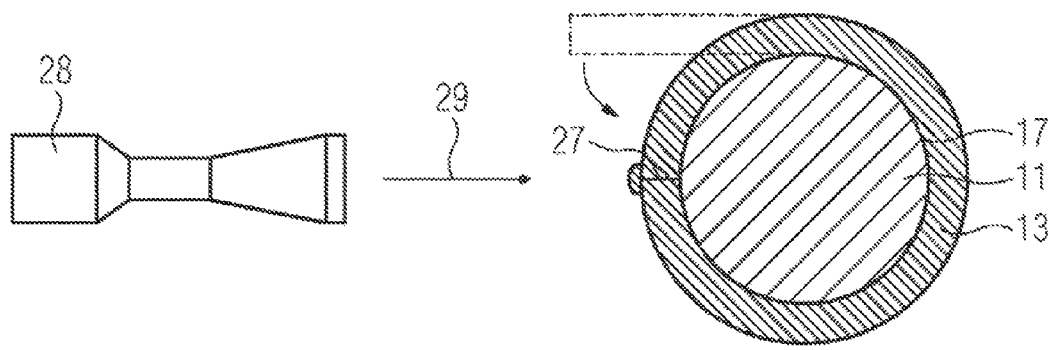
FIGS. 5 to 7 show exemplary embodiments of the cold gas spraying method according to the invention.
Figure 6:
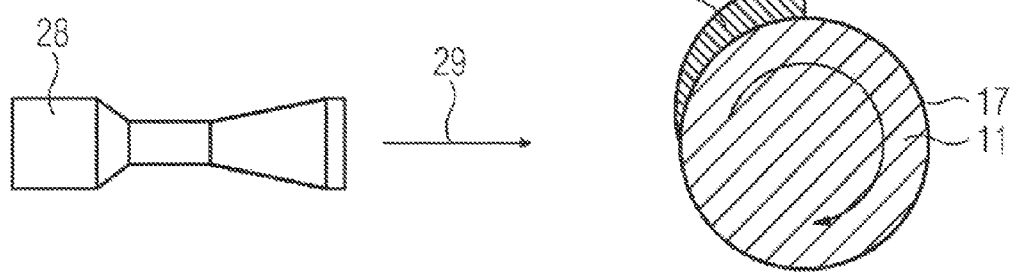
Figure 7:
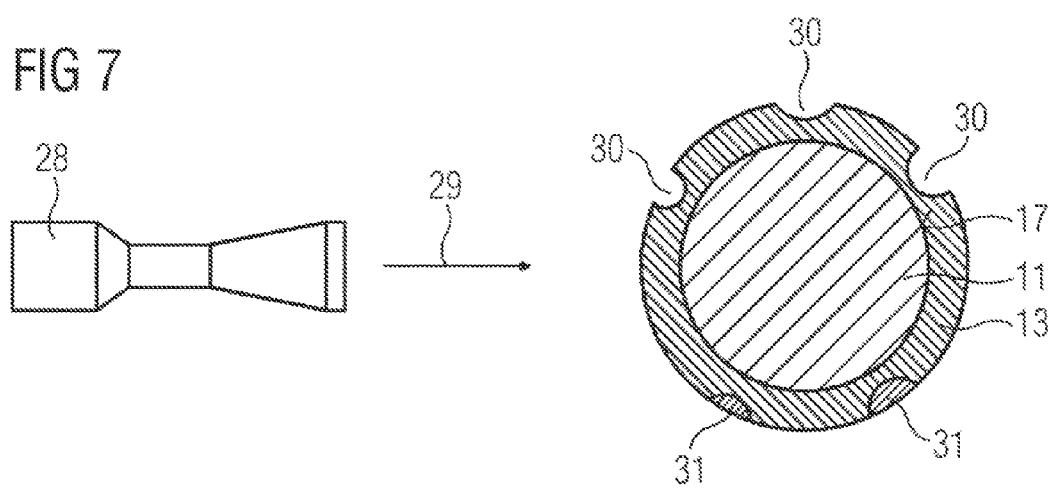

The cold gas spraying method illustrated in FIGS. 5 to 7 concerns various applications as to how this method can be applied to produce or repair the cladding 13 on the bogie shafts 11. According to FIG. 5, the cladding 13 consists of a covering, which is bent around the bogie shaft 11 (see dotted-and-dashed contour of the cladding 13, which indicates a shape as provided during the bending process). In this case, an abutting edge 27 of the covering is produced, at which opposite edges of the covering come to rest against one another. Cold gas spraying is used to seal this abutting edge or the gap produced thereby. A convergent-divergent nozzle 28 accelerates the coating particles (not illustrated) in a cold gas jet 29, wherein the particles are deposited above the abutting edge 27 due to their kinetic energy and thus seal the gap arranged beneath.

FIG. 6 illustrates how the cladding 13 itself is produced on the bogie shaft 11 by means of cold gas spraying. To this end, the bogie shaft 11 is slowly rotated, such that a relative movement between the cold gas jet 29 and the interface 17 of the bogie shaft 11 is produced. At the same time, an axial movement of the bogie shaft may occur (not illustrated), which is dimensioned such that a helical-like coating is produced at the interface 17. A closed cladding 13 is thus formed, wherein an intermediate stage of the coating process is illustrated in FIG. 6.

According to FIG. 7, cold gas spraying is used to remedy damage 30 (denoted as craters 20 in FIGS. 3 and 4) caused by stone impact. To this end, the damage is infilled merely locally by the particles of the metal component and possibly further particles, thus forming repair points 31.

The invention claimed is:

1. A bogie shaft assembly for a railway vehicle, the bogie shaft assembly comprising:
   a bogie shaft having an interface; and
   a cladding disposed on said bogie shaft and functioning as a stone guard, said cladding having a metal component being at most as electrochemical noble as a metal material forming said interface of said bogie shaft, and forming a metal matrix, in which a structural phase is distributed, said structural phase increasing a resistance of said cladding to stone impact.

2. The bogie shaft assembly according to claim 1, wherein said structural phase is formed by particles, said particles are embedded in said metal component of said cladding.

3. The bogie shaft assembly according to claim 1, wherein said structural phase is formed by particles selected from the group consisting of pseudo-plastic particles, pseudo-elastic metal particles, and particles of a material of which a modulus of elasticity is at most $1/10$ of that of said metal component of said cladding, wherein said particles are embedded in said metal component of said cladding.

4. The bogie shaft assembly according to claim 1, further comprising a partition coating formed from one of an electrochemically less refined material than said metal material forming said interface of said bogie shaft or from an electrochemically inert material disposed between said interface of said bogie shaft and said cladding.

5. The bogie shaft assembly according to claim 1, wherein said metal component of said cladding is electrochemically less refined than said metal material forming said interface of said bogie shaft and is in electrochemical contact with said interface of said bogie shaft.

6. The bogie shaft assembly according to claim 1, wherein said metal component of said cladding is selected from the group consisting of Al, Mg, Ti, Zn, Mn, V, Nb and alloys thereof.

7. The bogie shaft assembly according to claim 1, wherein said metal component of said cladding spontaneously forms a passivation coating under atmospheric influence.

8. The bogie shaft assembly according to claim 1, further comprising an indicator coating formed from a colored material and permeable to moisture disposed between said interface of said bogie shaft and said cladding.

9. The bogie shaft assembly according to claim 1, wherein said metal component of said cladding and said bogie shaft are made from steel.

10. A bogie shaft assembly for a railway vehicle, the bogie shaft assembly comprising:
    a bogie shaft having an interface; and
    a cladding disposed on said bogie shaft and functioning as a stone guard, said cladding having a metal component being at most as electrochemical noble as a metal material forming said interface between said bogie shaft and said cladding, said metal component of said cladding is coated with a shape memory alloy selected from the group consisting of a pseudo-elastic alloy and a pseudo-plastic alloy.

* * * * *